United States Patent [19]

d'Anjou

[11] 4,135,850

[45] Jan. 23, 1979

[54] VENTILATOR SYSTEM WITH ADJUSTABLE DAMPER FAN

[75] Inventor: Marcel d'Anjou, Ste. Adele, Canada

[73] Assignee: Mark Hot Inc., Quebec, Canada

[21] Appl. No.: 721,317

[22] Filed: Sep. 7, 1976

[30] Foreign Application Priority Data

Sep. 16, 1975 [GB] United Kingdom ................. 3800/75

[51] Int. Cl.[2] ......................... F03D 7/00; F04D 29/46; F01B 25/10; F01D 17/00

[52] U.S. Cl. .................................... 415/148; 415/157; 415/210; 415/217; 137/637; 74/105

[58] Field of Search ............... 415/210, 209, 208, 158, 415/157, 217, 216, 148; 74/20, 21, 101, 102, 105, 828, 829; 137/637

[56] References Cited

U.S. PATENT DOCUMENTS

| | | | |
|---|---|---|---|
| 1,604,328 | 10/1926 | Walker | 415/148 |
| 1,725,344 | 8/1929 | Dennis | 415/148 |
| 2,075,334 | 3/1937 | Braden | 415/157 |
| 2,452,274 | 10/1948 | Walters | 415/209 X |
| 3,625,629 | 12/1971 | Morrison | 415/157 |
| 3,784,318 | 1/1974 | Davis | 415/158 |

*Primary Examiner*—Carlton R. Croyle
*Assistant Examiner*—Donald S. Holland
*Attorney, Agent, or Firm*—Charles E. Brown

[57] ABSTRACT

A fan assembly for a ventilator system. The assembly comprises a fan housing having an inlet end and an outlet end. One or more blower wheels are secured for rotation in the fan housing to direct air from the inlet end to the outlet end. Each of the blower wheels has a plurality of inclined peripheral fan blades. Means is provided to support and impart a rotational drive to the blower wheels. An adjustable cylindrical damper is movably supported in closely spaced relationship to the periphery of the blower wheels to vary the quantity of fluid directed to the outlet end of the fan housing.

5 Claims, 4 Drawing Figures

VENTILATOR SYSTEM WITH ADJUSTABLE DAMPER FAN

BACKGROUND OF THE INVENTION (a) Field of the Invention

The present invention relates to a ventilator system, but more particularly, to an improved fan assembly for use in such system and incorporating an adjustable damper to vary the amount of air introduced into the system.

(b) Description of Prior Art

In ventilation systems, it is known to vary the quantity of air circulated therein. There exists the requirement for the provision of a fan that can provide a high degree of control between zero to maximum output effectively for the ventilator system. In the prior art, when no air is required for the system, the motor for the fan is shutoff or the opening at the inlet or outlet of the fan assembly is completely shut. Normally, the opening of such fan housings is provided with shutters which are adjustable to vary the amount of air introduced into the ventilator system. Such controls experience regions of instability thus preventing total control of the fan in the entire range of operation. A further disadvantage of providing such shutters is that these are subject to air pressure and vibration thus causing them to vibrate and create excessive noise and wear of their connecting joints. Still further, these shutters do provide an obstruction to the inlet and outlet of the fan assembly, which obstruction is undesirable. A still further disadvantage is that these shutters are difficult to assemble, require regular maintenance, and result in high electrical consumption of the fan assembly motors. Furthermore, these fans do not provide a high degree of control of the air stream going through the fan assembly.

SUMMARY OF THE INVENTION

It is a feature of the present invention to provide a fan assembly which substantially overcomes all of the above-mentioned disadvantages.

It is a still further feature of the present invention to provide a fan assembly having a variable volume to provide a sensitive control in a ventilator system.

A still further feature of the present invention is to provide an improved ventilator compartment unit.

According to the above features, from a broad aspect, the present invention provides a fan assembly for a ventilator system. The assembly comprises a fan housing having an inlet end and an outlet end. One or more blower wheels are secured for rotation in the fan housing to direct air from the inlet end to the outlet end. Each of the blower wheels has a plurality of inclined peripheral fan blades. Means is provided to support and impart a rotational drive to the blower wheels. An adjustable cylindrical damper is movably supported in closely spaced relationship to the periphery of the blower wheels to vary the quantity of fluid directed to the outlet end of the fan housing.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1:
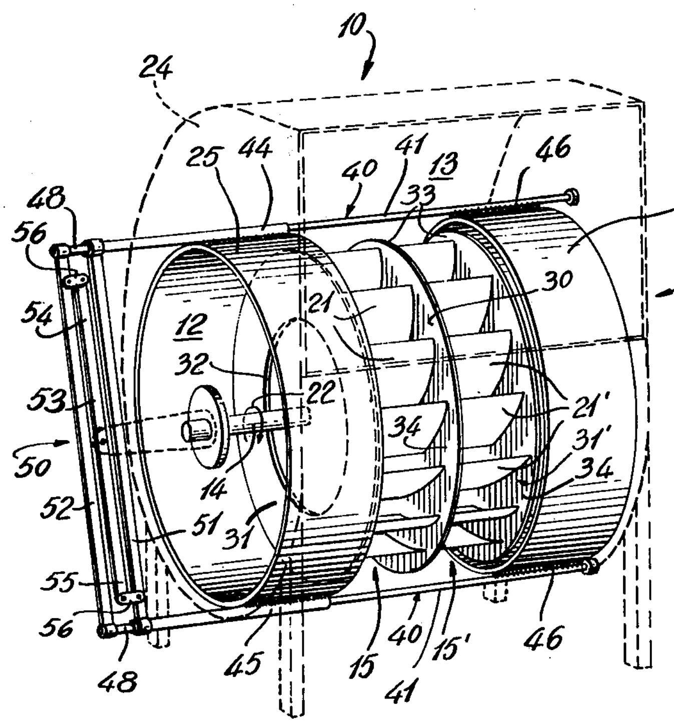
FIG. 1 is a perspective view of the fan assembly showing the fan housing in phantom line.
Figure 2:
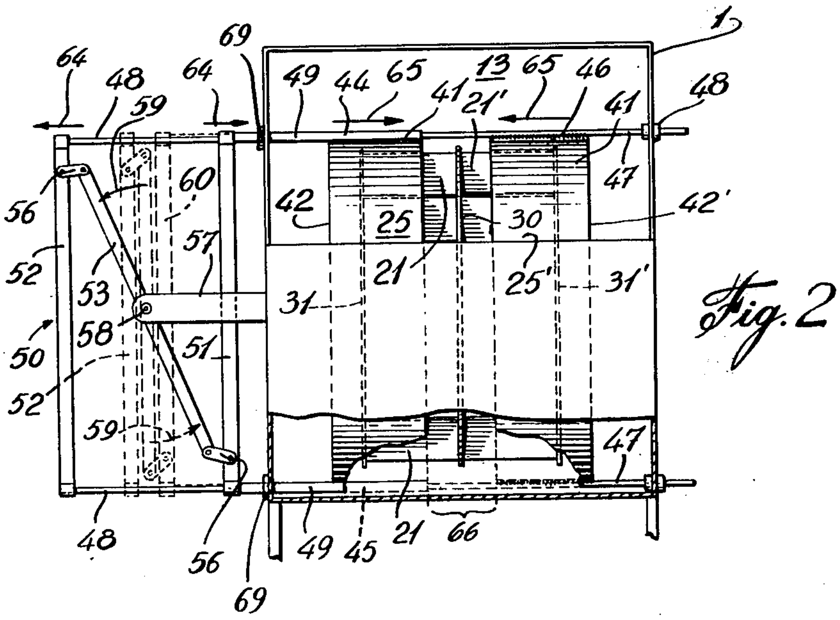
FIG. 2 is a fragmented side view of the fan assembly.
Figure 3:
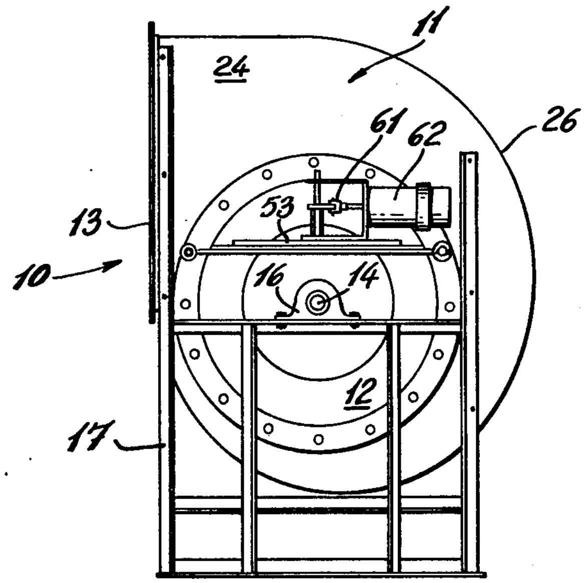
FIG. 3 is an end view looking from an inlet of the fan assembly.

Referring now to the drawings, and more particularly to FIGS. 1 to 3, there is shown generally at 10, the fan assembly of the present invention. The assembly comprises a fan housing 11 having an inlet end 12 and an outlet end 13. One or more blower wheels, hereinshown as two wheels 15 and 15', are secured about a drive shaft 14 which is mounted on a bearing support 16 secured to a frame 17. Although not shown, the wheels 15 and 15' are secured to the shaft 14 by means well known in the art. A drive motor 18 (see FIG. 4) imparts a drive to the shaft 14 via a drive belt 19 and a drive sheave 20 secured to the shaft 14.

As shown in FIGS. 1 to 3, the wheels 15 and 15' are mounted for rotation within the housing 11 and air is sucked in from the inlet 12 of the housing and directed to the outlet 13 by means of a plurality of inclined peripheral fan blades 21. Each wheel has a plurality of equally spaced apart, arcuate fan blades 21 having a backward inclined curve relative to the direction of rotation of the shaft, as indicated by arrow 22.

An adjustable cylindrical damper, hereinshown as two cylinder walls 25 and 25', are movably supported in closely spaced relationship to the outer peripheral diameter of the blower wheels 15 and 15' whereby each damper wall will vary the quantity of fluid, herein air, directed to the outlet end 13 of the housing through the spaces between the fan blades 21.

As more clearly shown in FIG. 3, the fan housing 11 is of a scroll shape and defines opposed side walls 24, a scroll wall or end wall 26 and an outlet opening 13 in an upper section thereof. The arcuate scroll wall 26 extends from the top of the outlet end 13 to an area below the outlet end 13 and close to the periphery of the blower wheels. There are two inlet ends 12 and each is provided in a respective one of the side walls 24.

The blower wheels 15 and 15' hereinshown comprise a common ring 30 and spaced end ring discs 31 and 31', all of which are spaced apart and lie in parallel relationship to one another. Each disc has an inner peripheral margin 32 and an outer peripheral margin 33. The fan blades 21 and 21' are secured transversely between the inner faces 34 of the discs 31 and 31'. It can be seen that when the wheels are rotated in the direction of arrow 22, the blades will suck the air from an area within the inner peripheral margin 32 of the discs and direct it under pressure through the spaces between the blades and externally of the outer peripheral margin 33.

Each cylinder wall 25 and 25' is movably supported in support guide means 40 slightly above the outer peripheral margin 33 of the discs. Alternatively, although not shown, the cylinder walls 25 and 25' could be located internally of the wheels and closely spaced to the inner peripheral margin 32 of the discs. As shown, the cylinder walls each have a width which is sufficient to cover the spaces between the fan blades spanning each pair of discs 30–31 and 31–31' or part thereof.

The support guide means 40 comprises one or more rods, hereinshown two rods 41, secured along a portion of their length to one of the cylinder walls, hereinshown cylinder wall 25', by suitable means such as the welds 46. As shown in FIG. 2, the rods 41 extend beyond the outer marginal edges 42 and 42' of the cylinder walls 25 and 25'. The extension rod section 47 adjacent the edge 42' extends into a bushing 48' secured to the housing 11 and is freely movable longitudinally therethrough. The rod extension portion 48 extends beyond the edge 42 of the cylinder wall 25, through a bushing 69 in the opposed wall of the housing, and is connected to link means 50 at its end whereby to displace the rods 41 axially in unison. A sleeve extension 49 is positioned about the rod section 48 adjacent the sleeves 44 and 45 secured to the cylinder wall 25. The sleeve 49 is connected at one end of sleeves 44 and 45 and secured to the ends of a first connector arm 51 forming part of the link means 50. Transverse displacement of the first connector arm 51 will cause axial displacement of the sleeve extension 49 and the cylinder wall 25.

The link means 50 also comprises a second connector arm 52 secured at opposed ends to a free end of the rod extensions 48. A pivoted link comprising a crank arm 53 interconnects both arms 51 and 52 together to cause relative transverse displacement of these arms with respect to one another. The crank arm 53 is pivotally secured at 58, and substantially centrally of the length thereof, to a fixed frame member 57. An articulate link 56 is pivotally secured at each end of the crank arm 53 and adjacent to an opposed end of the arms 51 and 52.

Referring to FIG. 3, there is shown a drive arrangement hooked up to the crank arm 53 whereby to cause pivoted movement of the crank arm along the direction of arrows 59 (see FIG. 2) to cause the arms 51 and 52 to move towards and away from each other from a fan open position, where the arms are close together as shown in phantom lines 60, to a spaced apart position, where the fan opening closes, as shown in FIG. 2. The drive means comprises a piston rod 61 actuable by a piston cylinder 62 which is suitably controlled by sensing means to control the position of the cylinder walls 25 and 25' which in turn controls the CFM (cubic feet of air per minute) displaced by the blower wheels 15 and 15'.

In operation, it can be seen that as the arms 51 and 52 are displaced away from one another in the direction of arrows 64, the cylinder walls 25 and 25' will move towards each other in the direction of arrows 65. This is due to the fact that the rods 41 are secured to the cylinder wall 25 and extends freely through the sleeves 44 and 45 and the sleeve extensions 49 and are connected at their ends to the arm 52 which moves outwardly, thus pulling the cylindrical wall 25' closer to the common wall 30 of the blower wheels 15 and 15' thus reducing the effective fan area, indicated by numeral 66. Each sleeve extension 49 is secured at one end to a respective end of the arm 51, and at their other end to a respective one of the sleeves 44 and 45. Thus, as the arm 51 is displaced in the direction of arrow 64, the sleeve 25 will be displaced in the direction of arrows 65. As both of the arms 51 and 52 move closer together to the position as indicated by phantom lines 60, the cylinder walls 25 and 25' will move away from each other making the effective fan area 66 much larger. That is to say, the exposure of the spaces between the fan blades 21 becomes larger.

Figure 4:
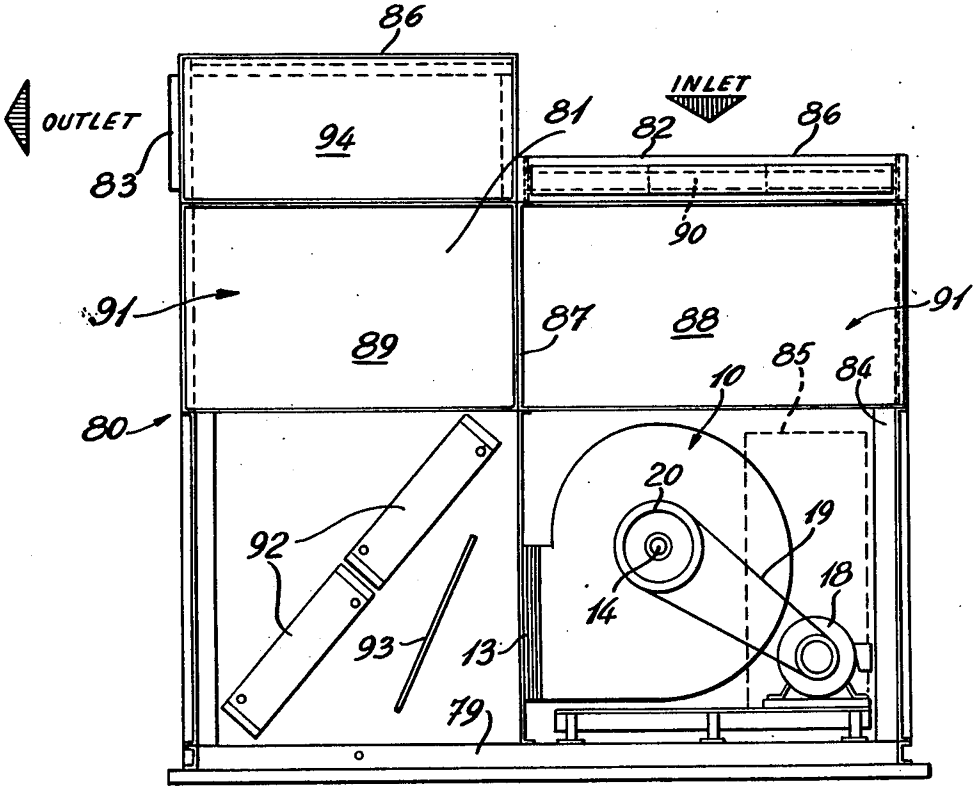
FIG. 4 is a section view of a ventilator compartment unit utilizing the fan assembly of the present invention.

Referring now to FIG. 4, there is shown, generally at 80, the construction of a ventilator compartment unit. The unit comprises a housing 81 having an inlet opening 82 and an outlet opening 83. The housing 81 is of substantially rectangular configuration and is provided with insulated panels such as shown at 84 to reduce the noise level of the fan assembly 10 positioned therein. A door 85 is provided in the housing for access to the fan assembly 10 and other component parts of the ventilator unit. The housing defines a bottom wall 79, a top wall 86 and a partition wall 87 divides the housing into two sections, one being a blower section 88 and the other an outlet section 89. The inlet opening 82 is provided with an air filter 90 and is positioned in the top wall 86 of the blower section 88. The fan assembly 10 is secured on the bottom wall 79 of the blower section 88.

The outlet open end 13 of the fan assembly 10 is positioned about an opening (not shown) in the partition wall 87 whereby to direct air from the inlet 82, through the fan assembly 10, and out through the outlet section 89 and the outlet 83 of the housing. A muffler unit 91, of common construction in the art, is positioned adjacent the outlet end 83. Cooling or heating coils 92 are positioned adjacent the bottom wall 79 in the outlet section 89 to cool or heat the air from the outlet end 13 of the fan assembly 10. In order to obtain a better distribution of air from the outlet 13, a diffusion plate 93 is secured between the outlet 13 and the cooling or heating coils 92. The chamber 94 above the muffler 91 is a plenum chamber and the outlet opening 83 is provided in a side wall thereof. The outlet 83, of course, will connect to the proper ducting leading to the various enclosures being ventilated. The ventilator compartment unit described above represents only one of the applications of the fan assembly of the present invention and may easily be modified. The fan assembly 10 can be utilized in many other types of ventilator compartment units or applications. Further, various modifications can be made to the fan assembly without departing from the scope of the present invention which is defined by the appended claims. For example, the link means 50 can be replaced by other suitable types of linkages to displace the cylinder walls. As mentioned above, the cylinder walls could be placed inside the blower wheels and close to the fan blades.

Although the above description relates to a fan assembly for pumping air, it is foreseen that the assembly principal can be used and applied to a fluid system where the fluid is a liquid. Thus, the blower wheels would be pumping wheels.

I claim:

1. A fan assembly comprising a scroll fan housing having an inlet end and an outlet end and opposed side walls, two blower wheels are secured side-by-side for rotation in said fan housing to direct air from said inlet end to said outlet end, each of said blower wheels having a plurality of inclined peripheral fan blades, said blower wheels having a common center ring disc and opposed end ring discs and a common drive shaft extending transversely and centrally of said wheels to impart a rotational drive to said wheels, two cylinder walls each being closely spaced to a peripheral margin of the ring discs of each said two blower wheels and movably supported to vary the quantity of fluid directed to said outlet end of said fan housing, said housing further having an end wall having said outlet end in an upper section thereof, and at least an arcuate wall extending from the top of said outlet end to an area below said outlet end close to the periphery of said two blower wheels, said inlet end being located in one of said opposed side walls about the axis of rotation of said two-blower wheels, said opposed spaced end ring discs each having an inner peripheral margin, an outer peripheral margin and an inner face, said plurality of fan blades being secured transversely between said inner face of opposed spaced end ring discs and said center ring disc, said fan blades being in spaced apart inclined relationship and defining fan blade spaces between adjacent blades, said wheels when rotated in a given direction causing a suction of fluid from an area within said inner peripheral margin of said discs and directing it under pressure through said spaces externally of said outer peripheral margin of said discs, said two cylinder walls varying the exposure of the space between said fan blades, support guide means to movably support said cylinder walls, said cylinder walls having a width sufficient to cover said spaces between said fan blades at said peripheral margin, link means coacting with said support guide means to cause said movement of said cylinder wall, extension means secured to each said two cylinder walls, said link means comprising a first and second connector arm secured to said extension means of a respective one of said cylinder walls, a pivoted link secured at opposed ends to a respective one of said first and second connectors, said pivoted link when displaced on its pivot axis causing movement of said cylinder walls toward or away from each other to vary the effective total area of said fan blades of said two blower wheels.

2. A fan assembly as claimed in claim 1 wherein said cylinder walls are spaced slightly above said outer peripheral margin of said end ring discs.

3. A fan assembly as claimed in claim 1 wherein said two cylinder walls are spaced side-by-side slightly above said outer peripheral margin of said two ring discs.

4. A fan assembly as claimed in claim 1 wherein said extension means comprises a first pair of spaced apart parallel rods secured to one of said two cylinder walls and supported for guided displacement between bushings secured in opposed side walls of said fan housing, a pair of spaced apart parallel sleeves secured to the other of said two cylinder walls and extending through said bushings in one of said side walls of said fan housing, a common free end of said pair of sleeves being secured to one of said first and second connectors, said rods extending through a respective one of said pair of sleeves and being secured at a common free end to the other of said first and second connectors.

5. A fan assembly as claimed in claim 4 wherein said pivoted link comprises a crank arm having one end of an articulate link secured at each end thereof, the other end of said articulate link being secured to a respective one of said first and second connectors, said pivoted link having a pivot connection to a fixed member and substantially centrally thereof.

* * * * *